(12) United States Patent
Lloyd (10) Patent No.: US 9,325,719 B2
(45) Date of Patent: Apr. 26, 2016

(54) METHOD AND SYSTEM FOR EVALUATING ACCESS GRANTED TO USERS MOVING DYNAMICALLY ACROSS ENDPOINTS IN A NETWORK

(71) Applicant: RedSeal Networks, Inc., Sunnyvale, CA (US)

(72) Inventor: Michael A. Lloyd, Belmont, CA (US)

(73) Assignee: RedSeal, Inc., Sunnyvale, CA (US)

( * ) Notice: Subject to any disclaimer, the term of this patent is extended or adjusted under 35 U.S.C. 154(b) by 53 days.

(21) Appl. No.: 14/524,887

(22) Filed: Oct. 27, 2014

(65) Prior Publication Data

US 2015/0128224 A1    May 7, 2015

Related U.S. Application Data

(60) Provisional application No. 61/901,271, filed on Nov. 7, 2013.

(51) Int. Cl.
*H04L 29/06* (2006.01)

(52) U.S. Cl.
CPC ............... *H04L 63/102* (2013.01); *H04L 63/20* (2013.01)

(58) Field of Classification Search
CPC ....................................................... H04L 63/20
USPC ............................................................ 726/1, 6
See application file for complete search history.

(56) References Cited

U.S. PATENT DOCUMENTS

2015/0082399 A1*  3/2015  Wu ..................... G06F 21/6209
                                                            726/6

* cited by examiner

*Primary Examiner* — Jacob Lipman
(74) *Attorney, Agent, or Firm* — Kilpatrick Townsend & Stockton LLP; Kenneth R. Allen (57) ABSTRACT

A network analysis tool is provided in support of a data communication network having user devices at indeterminate endpoints wherein user identities, namely, the collection of meta-data about a user device of a network (beyond the conventional networking concept of an endpoint address), is modeled as fixed endpoints for purposes of tracking. More specifically, users at indeterminate endpoints are identified by modeling using user roles as models of the user devices.

8 Claims, 4 Drawing Sheets

METHOD AND SYSTEM FOR EVALUATING ACCESS GRANTED TO USERS MOVING DYNAMICALLY ACROSS ENDPOINTS IN A NETWORK

CROSS-REFERENCES TO RELATED APPLICATIONS

This application claims benefit under 35 U.S.C. 119(e) to provisional patent application Ser. No. 61/901,271 filed 7 Nov. 2013.

STATEMENT AS TO RIGHTS TO INVENTIONS MADE UNDER FEDERALLY SPONSORED RESEARCH AND DEVELOPMENT

Not Applicable

REFERENCE TO A "SEQUENCE LISTING," A TABLE, OR A COMPUTER PROGRAM LISTING APPENDIX SUBMITTED ON A COMPACT DISK

Not Applicable

BACKGROUND OF THE INVENTION

This invention relates to network security and in particular to methods for determining identity, as herein understood, in network data communication. More particularly this invention relates to end-to-end network modeling extended to incorporate and properly model the identity capabilities in network equipment. As herein used, "identity" refers to the identification associated with meta-data about the user of a network, beyond the conventional networking concept of an endpoint address for a node.

Known Information Technology (IT) networks use Internet Protocol (IP) addressing to enable communication. Multiple devices make decisions about IP packet headers (and sometimes message content), including devices such as routers and firewalls. These devices interact in complex ways, making it difficult for IT staff to correctly predict or understand end-to-end effects. As an example, when access is blocked between two locations, the immediate issue is: Why is it blocked? Is it a deliberate decision of a security device (which is configured to prevent this access and others), or is it an unintentional failure of the intervening equipment? Alternately, if access is allowed, why is it allowed—what path does it follow? These issues may appear to be simple, but networks are explosively complex. Similar to the game of chess, the number of rules is modest, but the number of possible combinations is extremely large, which presents a formidable barrier to understanding.

In-line network technologies also grow more complex over time, allowing or denying access in a manner that increases with complexity. This also presents a barrier to understanding. Neither the added technology nor existing selected technologies need to be particularly complex. By way of analogy, consider adding one more rule to chess. Since the game is already complex to play with a simple rule set, adding even a simple rule can make the game even more difficult to analyze.

In response to such increase in complexity, technologies have been developed to model complex networks in order to answer key questions for network designers, builders and operators. These technologies model the individual rules of multiple devices to see how they interact as an end to end system. Key to these products is the modeling of interaction. This modeling is not just how one rule or one device operates, but it is aimed at determining how a whole system behaves in aggregate. The chess analogy applies: It is easy to analyze the rules for how one chess piece is allowed to move, but it is difficult to analyze a whole chess match. Likewise, the subject techniques do not deal merely with individual devices, but rather with complex, interacting sets of devices. Herein, these products are referred to as "end to end network modeling" technologies. Examples of techniques of this category have been incorporated into commercial products offered by the assignee of the present invention, and they are marketed under the names Network Advisor and Vulnerability Advisor, but examples also include the products offered by Skybox Security, Athena Security, FireMon, and others. This active market space focuses particularly on security questions in "end to end modeling." There are other, related spaces for technologies focused on green-field design, or operational availability questions. Examples of vendors of such products include OpNet Technologies, Netsys Technologies, and the Wide Area Network Design Laboratory.

One of the challenges in the field of end-to-end network modeling is the rapid pace of technological changes in the network components. Many new network capabilities are evolutions of existing methods, but others represent a concept shift in how end-to-end connectivity is created or controlled. One recent area of innovation has been the incorporation of "identity," as herein defined, into some classes of network devices. For example, users may be required to log in to some authentication scheme before being allowed access to certain network assets. The technologies to correlate network flows with notions of "identity" coming from "above" the network layer have been developing in recent years. Examples of this technology include various Network Access Control (NAC) products, including offerings from Cisco Systems, Juniper Networks, and others. These techniques broadly deal with the connection of the endpoint to the network, close to where the device in question physically connects. Other approaches include various devices primarily associated with mobile devices—an approach generally known as "Bring Your Own Device" (BYOD), in reference to employees purchasing network endpoints, and in reference to the additional security and infrastructure requirements needed to allow personal devices to operate safely and correctly in a corporate environment. Another related technology deals with mid-path "identity controls," most often as a feature of a firewall or other mid-path device, which can enforce rules about low level network flows based on correlation with higher level models of end user identity. (This is distinct from conventional firewalling, which operates in an end-to-end network by enforcing policies written about the endpoint addressing or protocols in use, and which do not always correlate well with the user identities.)

The core behavior of an end-to-end network modeling technology is the computing of access between two endpoints across the network. However, the core challenge with "identity" technologies, as herein defined, is that in a network they do not deal with endpoints, that is, in the course of a day, for example, a single user may log in from a variety of devices, in different locations, or over more than one device with a different endpoint address at the same time. Identity is relatively statically allocated (generally belonging to a single network user), but highly dynamic on the network itself, as the user moves between devices and locations.

Networking equipment products that deal with identity generally work locally. In other words, the products enforce policy locally or for a zone, including dynamic state that relates identity to an endpoint or session. This mapping of a user identity to an endpoint or session is ephemeral: it is generally held as dynamic state in the memory of the network control point. However, there are rules of two main sorts: a first rule to allocate users to groups, and a second rule to enforce policies on those groups. The first form of rule, mapping users to groups, may occur on the network control point, or elsewhere. (For example, the users may be represented in another user identity store, such as Microsoft's Active Directory or other competitors, and the mapping to groups may occur in that separate system.) The second rule, tying the group to a behavior or set of access rules, is typically configured on the network control point and is much less dynamic. Product literature and published art often refer to "dynamic policies" in this context, but the dynamism is in the first class of rule—the mapping of identities to groups. The behavior for the group is typically more static, in that they are held in configured rules that are changed occasionally by operations staff.

Collecting live data on dynamic users involves substantial practical challenges and operational burdens, while the static rules are generally available to existing protocols and tools that are already capable of gathering non-identity-configured rules from similar equipment.

There is a distinction between endpoint controllers and session controllers. The distinction, as later explained, are material to the details of the invention.

In previous end-to-end network modeling, typical analysis results include the response to queries regarding what access is possible between one endpoint and another endpoint, or regarding the access means permitted across the network. This involves understanding the various interacting technologies between the two endpoints. This is a complicated technical process in itself, but it depends fundamentally on having endpoints or a set of endpoints in the model. Modern mobile devices are extremely fast-moving, making it technically difficult and expensive to gather instant by instant telemetry on every endpoint as it moves around, frustrating the ability of operations staff to benefit from the end-to-end modeling capabilities.

What is needed is a mechanism to increase the accuracy of identification as herein defined in such dynamic environments.

SUMMARY

According to the invention, a network modeling scheme is provided in support of a data communication network having user devices at indeterminate endpoints wherein user identities, namely, the collection of meta-data about a user device of a network (beyond the conventional networking concept of an endpoint address), are modeled as fixed endpoints. To this end, user roles of real users are modeled as network locations. A split in rule types is invoked to recognize the relatively dynamic mapping of user identities to groups and to distinguish dynamic mapping from comparatively static rules applied to groups. To apply this distinction to end-to-end network modeling, the groups are treated as structural objects as if they were objects such as "subnets" or "endpoints." Accordingly, the modeling process focuses on the groups or sets on which the policies are enforced, which may not correspond one-to-one with user identities per se, but which are stable and uniquely defined enough to perform as a type of "endpoint" in an end-to-end model. More particularly, a first domain is defined to track which endpoints are currently active with associated identities at which locations on the network. A second domain is defined to examine the structure of the identity groups at the enforcement points, investigating whether these are configured correctly (in conjunction with the rest of the network) so that future or current connections of users in the actual communications network will be able to obtain the intended access.

In some embodiments of the invention, the first challenge (tracking current endpoints) need not be performed at all. There is significant utility in focusing solely on the second problem (analyzing identity groups and associated configurations in context of a whole network). In other embodiments, both challenges may be addressed with an ideal implementation expressing both steps, namely separating the ephemeral "who is connected where now?" step from the relatively static step and question: "Which rules apply to users who connect now or in the future?"

The invention enables extensions of an end-to-end network modeling system to model identity enforcement approaches. Prior to use of the invention, the end to end network modeling system uses properties of the endpoints and the network to compute and display whether network access is permitted or not. For one specific example, an IP-based end-to-end network modeling system may show whether a given IP endpoint can exchange communication over a given TCP/IP protocol with another IP endpoint. With the invention, this modeling can incorporate technologies in the actual network which perform "identity enforcement," which by definition is not a standard property of the network communication. Identity is a property associated with a user and/or a device, but not with a specific network address. The "identity" is usually permitted, in the actual network, to show up in more than one address at a time, and/or over more than one device at a time, and/or to move over time from one address to another.

In the following detailed description, reference is made to the accompanying drawings which form a part hereof wherein like numerals designate like parts throughout, and in which is shown by way of illustration specific embodiments in which the invention may be practiced.

DETAILED DESCRIPTION

The following terms are used in connection with this disclosure as terms of art. These terms should be familiar with those of skill in the art.

Identity Group:

A "container" found in identity stores and identity enforcement points which arranges records about individuals (such as employees or users) into sets (of at least one element each, but typically more). These containers permit expression of policy, such as "users in group X are permitted (or denied) access to endpoint Y."

Identity Interface:

A modeled item in the end-to-end network analysis system. An interface generally shows a connection between elements; typically, in an end-to-end network analysis system, an interface is used to represent the connection between a local area network domain and a connected router or similar network device. (The notion of an "identity interface" is a key part of the invention—the creation of a connection point between the abstract concept of the identity group (seen as a set of users) and the wider network.) This interface generally does not exist in the real network, but it is added according to the invention to show where the users are first evaluated for their specific access rights, at the identity enforcement point.

Device Configuration Data:

The conventional description of the settings on any of a class of network devices. This is one of the standard inputs to an end-to-end network modeling system.

Standard IP Interface:

A standard interface for connection between a network area and a forwarding network device. When the interface has an associated Internet Protocol address, it is known as a "Standard IP Interface."

Access Rule:

A statement permitting or blocking flows of a given type at a given location in a network. For example, any typical network forwarding device can be configured to permit or to discard certain classes of traffic, based on properties observed in the traffic. Identity enforcement points or nodes also apply access rules, but they can operate on rules outside the communication content itself, including the identity and group of the user previously identified as using the given endpoint.

Endpoint:

A location on a network intending to communicate with another such endpoint. (In conventional Internet Protocol networks, an endpoint receives one or more IP addresses.)

End to End:

Used to differentiate two classes of analysis methods applied to networks. One class isolates individual devices or configuration details to ask "what does this element do?" or "is this element configured appropriately?" This is referred to as "element management." Another class of system-wide analysis systems exists, which is the subject of this invention. They are referred to as "end to end" because they consider much or all of the network path between two endpoints—not just one device at a time, but instead considering all the complex, interacting elements that add up to either permit or block some endpoint communication.

Figure 1A:
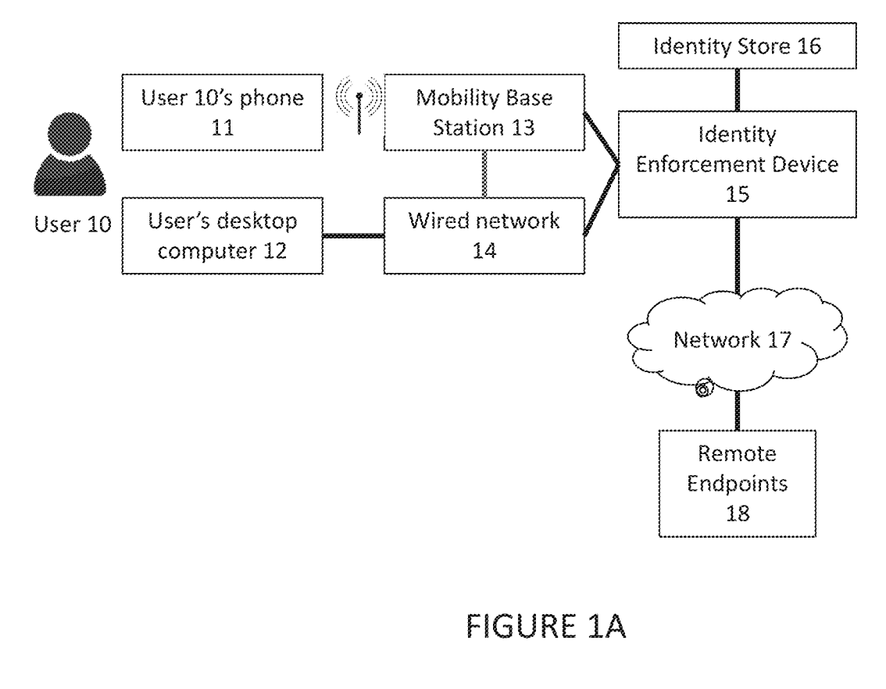
FIG. 1A is a functional block diagram of an actual communication network showing relevant functional elements according to the invention.
Figure 1B:
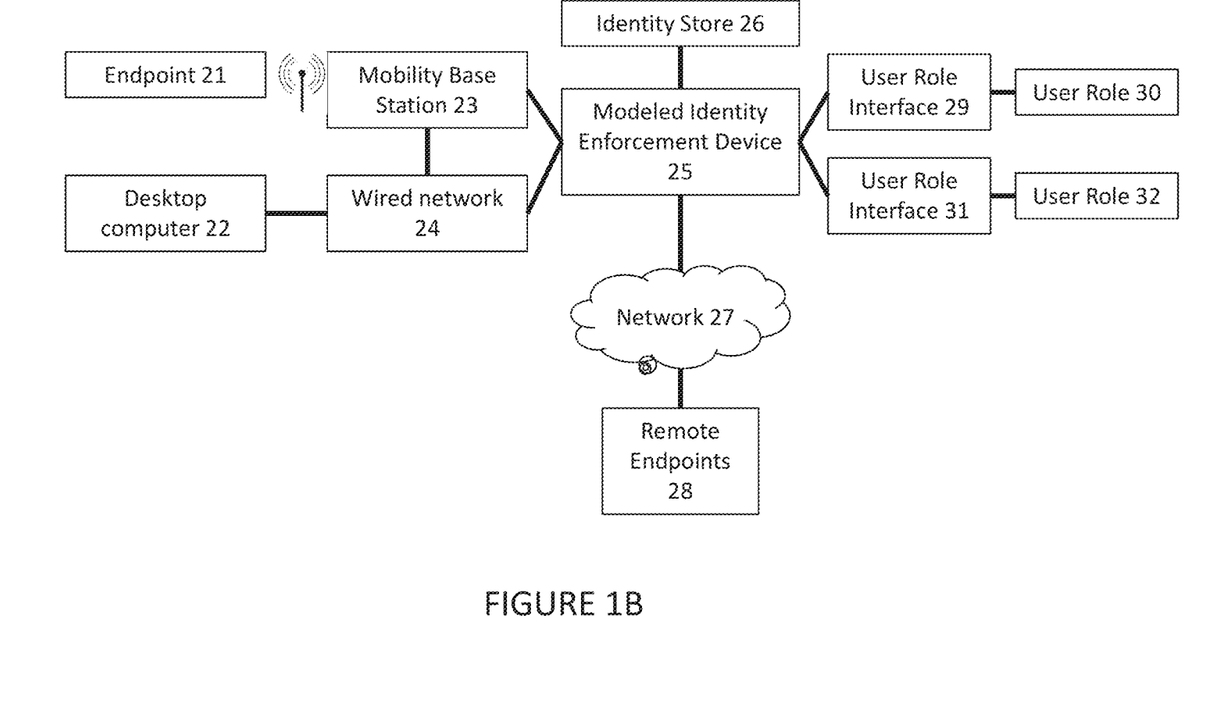
FIG. 1B is a functional block diagram of a model of the actual communication network of FIG. 1A showing the use of user roles as a substitute for users in accordance with the invention.

FIG. 1B illustrates the invention, a modeling scheme, to be compared to FIG. 1A, which is the actual network modeled by the invention. The depiction of FIG. 1A is representative of a real-world environment, including a user 10 attempting to communicate over a network 17. Before user 10 can access the network, the user 10 must connect to reach the remote endpoints 18. Various choices for connection are illustrated by way of example, such as either a wireless device 11 or a wired device 12 at the user's endpoint, such as a phone 11 or desktop computer 12. These endpoints typically connect to corresponding media technologies such as mobility base station 13 and wired network 14. Whichever access method the user 10 selects, the access method is required to pass through an identity enforcement element or device 15, where two major steps occur: first, the user is challenged for authentication which report is compared to information in an identity store 16. This allows the identity enforcement device 15 to associate endpoints such as wireless device 11 and wired device 12 with a user role or group based on the authentication of user 10 with the information in identity store 16. In the second major step, access policy can be enforced on transmitted data (typically packets) sent by endpoints such as wireless device 11 and wired device 12, permitting or denying access to the wider network 17, depending on the access rules associated with user 10. All of these stages are shown as they occur in a typical network; those skilled in the art will recognize a variety of possible implementations.

FIG. 1B shows the invention herein applied to a typical end-to-end network modeling system. Many of the endpoints correspond directly—for example endpoint 21 in the modeled network corresponds to endpoint 11 in the real network. Desktop computer 22 in the modeled network corresponds to User's desktop computer 12 in the real network. Mobility base station 23 in the modeled network corresponds to endpoint 11 in the real network. Wired network 24 in the modeled network corresponds to wired network 14 in the real network. Modeled identity enforcement device 25 in the modeled network corresponds to identity enforcement device 15 in the real network. Network 27 in the modeled network corresponds to network 17 in the real network. Remote endpoints 28 in the modeled network correspond to remote endpoints 18 in the real network. In the invention, actual physical devices may be employed for each element, or simulations may be employed for physical elements. The difference between the model and the real network that is modeled is the addition of user roles 30 and 32 for one or more actual users such as user 10, in the form of user role 30 and user role 32 coupled according to the invention by logical user role interfaces 29, 31 to the identity enforcement device 25. The user roles 30, 32 represent two of the many possible roles known to identity enforcement device 15 modeled as identity enforcement device 25. Rather than representing user 10 directly, the invention adds sufficient user role objects to identity to the model enforcement device 25 the set of possible user configurations of the user 10 that can connect to the enforcement device 15 of FIG. 1A. This is done in the form of the user roles 30 and 32 connected via the virtual interfaces 29, 31 that "spoof" local endpoints as viewed by the modeled identity enforcement device 25.

The invention described herein does not preclude representing user 10 directly; however, the invention does decompose the problem of the access granted to user 10 into two components, one of which is the dynamic association of user 10 to a varying set of endpoints such as 11 and 12, and the other of which is the relatively static user role or group policies enforced at identity enforcement device 15 in the real network, and represented in the end-to-end network modeling system via the user role objects 30 and 32 through the interfaces 29 and 31.

Figure 2:
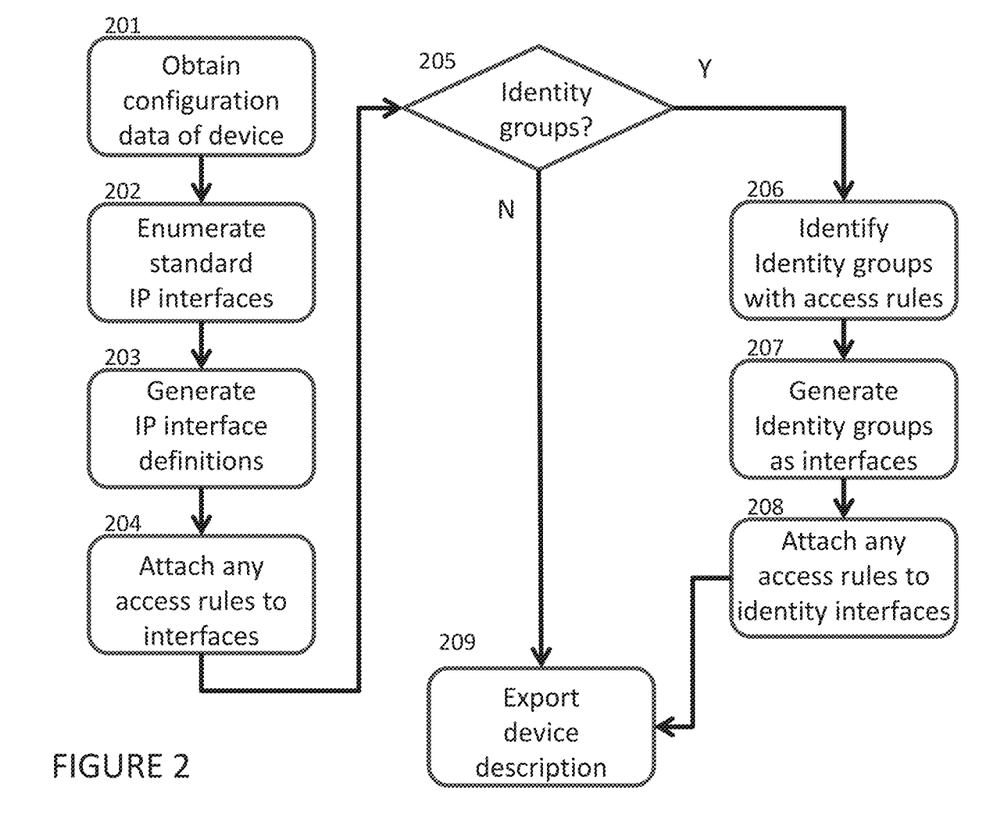
FIG. 2 is a flow chart of a method according to the invention.

To perform the method according to the invention, the steps illustrated in FIG. 2 are invoked. These steps may be programmatically implemented in a digital computer as part of the network model of FIG. 1B. The network model system first obtains configuration data of the device (step 201), enumerates standard IP interfaces (Step 202), generates IP interface definitions (Step 203), and attaches any access rules to the interfaces (Step 204). The system then tests to determine if there are any identity groups (Step 205). If not, the system exports the device description using the conventional representation of the end-to-end network modeling system (Step 209). If yes, the system identifies "Identity Groups" with access rules (Step 206), then generates the Identity Groups as interfaces or connections to the identity enforcement device 25*t* (Step 207) and attaches any access rules to the identity interfaces (Step 208). Thereafter, the system exports the device description for each Identity Group (Step 209).

Figure 3:
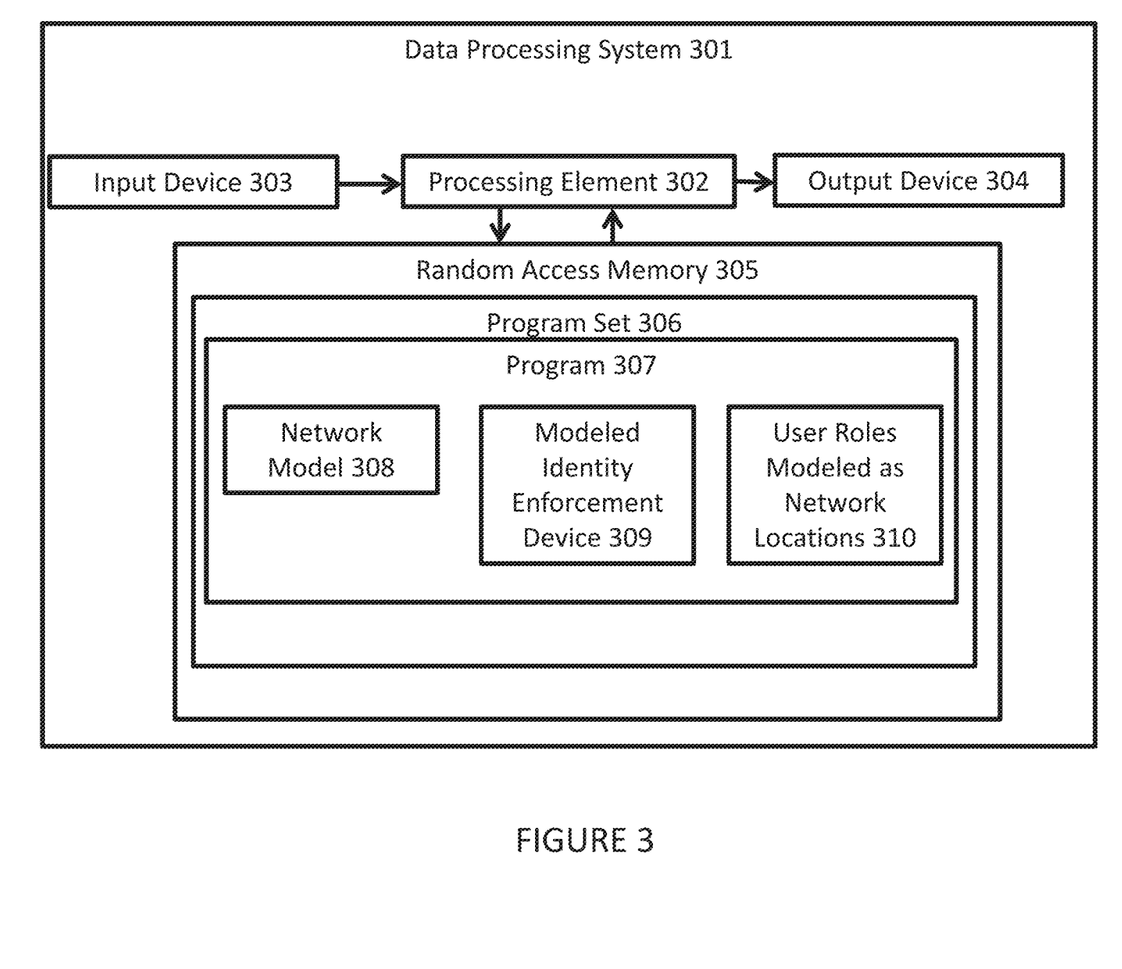
FIG. 3 is a block diagram of the components of a diagnostic tool having components that operate in accordance with the invention.

The invention could be implemented in either hardware in the structure of FIG. 1B or in software wherein the components are implemented as processes in a general purpose data processing system 301, as illustrated in FIG. 3, which has a processing element 302 such as a central processing unit or distributed or parallel processor array. An input device 303 serves as the input interface with the input endpoints, and an output device 304 serves as the interface to the network 27 (FIG. 2B). A random access memory 305 provides the processing element 302 with access to data and a program set 306. The program set 306 according to the invention includes a network model 308, a modeled identity enforcement device 309 and user roles modeled as network locations 310 including the user role interface function as herein explained. The program 307 with network model 308 would typically include a network map having endpoints and representations of users, groups and a communication medium. The program 307 is built upon a set of rules 340 that control the system 301. The processing element serving as the model controller is configured by the program 307 to split rule types between dynamic mapping rule types and comparatively static rule types in order to recognize relatively dynamic mapping of user identities to groups. The model controller is further configured to permit the model to distinguish between dynamic mapping rules and comparatively static rules applied to groups.

As an illustrative example of how the invention operates (but not a limitation), consider a company with five teams—Sales, Research & Development, General & Administrative, Marketing, and Services & Support. Suppose the company also wants to allow guest access to limited network assets, or to outside resources such as the Internet. Common examples of technologies to control access using identity can include (but are not limited to) wireless and wired identity-aware controllers, which require user login or make use of standards such as 802.1x. These "on ramps" can categorize various devices into different groups (potentially in the form of a VLAN, but also in other containers), then allow different access—for example, permitting G&A access only in the headquarters facility, but not elsewhere. They can also enforce rules as part of an end-to-end access system—for example, permitting R&D users to send packets towards R&D servers, but blocking others. This local enforcement does not generally guarantee access—it permits only access at this "on ramp". To understand whether users in R&D can actually reach the R&D servers (and nothing else), it is necessary to apply end-to-end analysis, as hereinafter explained.

As a further non-limiting example, consider guest users—people who cannot authenticate as existing employees in any of the internal groups but that may still be allowed to connect to the network. The main objective is to ensure that these guest users can only connect across the corporation's fabric out to the external network (eg, the Internet). The local access control cannot guarantee this limitation. The "on ramp" local controller can control the guest user, and can use one of several techniques to segregate, mark, or influence the traffic from the guests, but it cannot guarantee end-to-end transit out to the Internet without other access. This can be provided by the wider network, but only if it is configured correctly to respect the segregation or marking done by the local controller. Again, according to the invention end-to-end analysis is needed to ensure the local configuration of the identity-aware controller is in agreement with the wider network configuration to deliver a coordinated goal (in this case, permitting guest traffic across, but not into, the corporate network).

Continuing the (non-limiting) example, a second class of technology could be deployed by the organization to enforce identity controls "mid-path", or (typically) closer to the destination endpoint than the source. The business objectives for this technology are broadly similar, but the technical implementations differ due to the different constraints. A common approach for "mid-path" identity based filtering is to block sessions until the associated user can authenticate via some challenge mechanism. (Technologies also exist to mark the identity, or more commonly identity group, onto the packets moving on the network. This faces some deployment and adoption challenges, but the technology is still amenable to the analysis according to the present invention. It can often be classed with the technology approaches already described, working from the local access point, but extending control further out.) When mid-path identity based technologies are used, they generally have the same two-part distinction: relatively static rules applied in the local configuration of the mid-path device, versus potentially dynamic information to associate individual identities to rules.

An example of this is a firewall configured in the conventional manner and having many rules to permit or deny access to/from specific sets of endpoints if seen at this local mid-path control point. ("Mid-path" is used here to refer to techniques most often seen after the first access "on ramp" used by a device on a network. It is not a limitation to the use of the technologies—for example, the "mid path" approach could be implemented on the final endpoint in the network path.) The firewall may also support configuration on some rules, such as a keyword "auth-proxy" or "auth." These keywords typically trigger a challenge for any new sessions attempting to gain access via that firewall rule. The challenge involves an authentication protocol, so the user can establish an identity (often not performed locally within the firewall), and if the challenge is passed, the user's session is allowed to proceed. Here again, the access can be broken into two parts: the relatively fast-moving user, who may use multiple devices at the same time, or access at different times, versus the relatively static configuration of the rule within which authentication challenges are used. This is a second example of the components for modeling described in this invention.

Two Approaches

The previous examples include references to two modes of identity enforcement: at the first access point onto the network, and later, either mid-path or at the far endpoint for communication. The changes to established end-to-end network modeling technologies differ in some details for these styles of enforcement; those skilled in the art can readily extend the ideas to other forms of identity enforcement in the network.

For the devices controlling the access point to the network (for example, using 802.1x or other access control approaches), the best known implementation is to indicate identity groups as "pseudo-endpoints" in and end to end model. The group "R&D" in the previous example isn't a "network endpoint" per se, but it is useful to represent this group separately from its contents as a directly usable object. As a (non-limiting) example, it is useful in end to end network modeling systems which allow queries of the form "what can endpoint X reach?", or "can endpoint set Y reach endpoint set Z?", to treat user groups as pseudo-endpoints, connected to the local controller, and representing the controls on that group. Then the end to end network modeling system can answer questions of the form "what can group R&D reach?", or "can endpoints in group R&D reach from the endpoint controller to the R&D servers?". Note that these queries can usefully be performed separately from queries about which end devices are actually associated to the group at a moment in time.

A challenge for the end-to-end network modeling system is the group identity in the pseudo-endpoint that is not generally recognized by other network devices—that is, much or all of the rest of the network does not know about or enforce rules based on "Sales" vs "R&D". Rather, the rest of the network uses an address scheme—for example, IPv4 or IPv6 addressing. So the end-to-end network modeling system needs to establish an address range or set that encompasses the possible choices that may have been dynamically assigned to the true endpoint. There are several choices in this area today, including allowing all address space (in IPv4, from 0.0.0.0 to 255.255.255.255), or permitting manual configuration of the desired range by the operator of the end to end network modeling system. In some cases, the information can be extracted from the configuration of the local identity-aware controller, or from associated network equipment. For example, users in a group may only be able to arrive over a specific VLAN, WLAN or physical interface, and their addressing can be deduced from this. Other access controllers may also serve out dynamic endpoint addresses to associated active users, from pools under their control. Extracting the pool or other indication of the legal options for endpoint addressing can allow the end to end network modeling system to automatically associate the addresses usable by an identity group with the pseudo-endpoint in the modeled environment. Those skilled in the art will perceive alternate approaches to the core problem of connecting pseudo-endpoints which represent identity groups with the effective addressing used by members of that group. (Note that mapping may not be unique—it is often possible for multiple identity groups to have the same legal range of addresses shared between them.)

The implementation specifics for a "mid-path" enforcement device are somewhat different, but follow the same decomposition. The first step for an end to end modeling system is to note that mid-path enforcement of an identity rule is being used at all. The standard method for computing access before considering identity is to represent the set of flows of interest, and walk across the network from the source or the destination end, looking for configuration rules that permit, block, or modify the flow. (Network Address Translation—NAT—is one example of a mid-path flow modification.)

The properties used to define a flow will vary, depending on the network technology under consideration—for example, the standard packet header description in an IPv4 network consists of 5 fields (the source and destination IPv4 address, the choice of IP protocol number, and when appropriate, the source and destination port numbers). These fields may be filtered or rearranged by steps along the path, and the end to end network modeling system will compute the effects of these changes. The addition of mid-path identity enforcement can be implemented by the addition of one more field to describe the flow—at least initially, a single bit to describe "has an identity challenge been applied?", or alternately, "has a device enforcing identity been encountered yet in this path?" This single bit implementation is an illustration of a minimal possible embodiment of the invention, but generalizations are possible (some of which will be discussed herein). A flow may start from the source with the bit set to indicate that no mid-path enforcement has yet occurred, and as the flow propagates across the modeled network infrastructure, the bit can be set to true whenever an identity-enforcing device is encountered. This permits the end to end network modeling system to treat "identity" as one more field in the modeled flow, similar to explicit properties of the packet header.

The single bit approach for mid-path identity checking is a minimal implementation. Extensions can enrich the properties modeled in this additional flow description field—for example, the modeled flow can carry information on which node or nodes in the network enforced a policy test. Other extensions include modeling the specifics of the identity test used—was the identity decision wholly enforced by an external system, or at least partially dependent on details of the configuration of the mid-path enforcement device? Further extensions include modeling the content of the identity database which evaluates the endpoint response to the mid-path challenge; this level of extension can permit tracking the actual identities that are permitted or denied at the given mid-path hop. Further extensions will be obvious to those skilled in the art; the ideal level of detail in the model will depend on the circumstances of use of the end to end network modeling system.

By way of encapsulation of key aspects of the invention, there is a data processing system and an associated method. The data processing system comprises a processing element, random access memory having storage for a program set and for data, at least one input interface device for receiving configuration information about a real network, the program set including a model of a portion of the real network, the model including a representation of an identity enforcement device and an element for modeling, as network locations, user roles of user devices of real users at indeterminate endpoints in the real network, the model being configured to determine access granted between members of the user roles and the model of the portion of the real network, and an output interface device for extracting the information from the model.

A method according to the invention comprises modeling, using a processing element and random access memory storing a program set, a data communication network having user devices at indeterminate endpoints, the program set including a network model, a modeled identity enforcement device and user roles modeled as network locations, and employing the user roles to determine, from the modeling step, access granted by the modeled identity enforcement device to the user role in the network model with respect to real user devices at indeterminate endpoints in a portion of the real network. The method may further be defined in that the employing step comprises utilizing a user role interface added to the modeled identity enforcement device as if network traffic originated at the user role interface. Further, the modeling step and the employing step may comprise obtaining configuration data of the modeled identity enforcement device associated with the real users, generating interface definitions for each user device from standard interfaces in order to establish a device interface, thereafter testing for identity groups and if none exists, exporting a device description of the device, and if identity groups exist, identifying identity groups with access rules, then generating identity groups as identity interfaces for the modeled identity enforcement device and producing a device description; and then exporting the device description of the device.

The method may further be defined in that, after the generating step and prior to the testing step, attaching optional access rules to the identity interfaces. The basic method may be further refined in that the user roles employing step includes defining dynamic mapping rules applied to groups, defining static rules applied to groups, and distinguishing between the dynamic rules and the static rules during determining access.

The invention has now been explained with reference to specific embodiments. It is to be understood that other embodiments may be utilized and structural or logical changes may be made without departing from the scope of the present invention. Therefore the invention is not intended to be limited, except as indicated by the appended claims and their equivalents.

What is claimed is:

1. A data processing system for modeling access of users to a real data communication network comprising:
   a processing element;
   random access memory for nonvolatile storage for a program set for modeling and for data associated with the modeling;
   at least one input interface device for receiving configuration information about the real network;
   said program set including a model of a portion of the real network, the model including a representation of an identity enforcement device and an element for modeling, as network locations, user roles of user devices of real users at indeterminate endpoints in the real network, the model being configured to determine access that has been or is granted between members of the user roles and the model of the portion of the real network; and
   an output interface device for extracting information from the model.

2. A method for modeling access of users to a real data communication network comprising:
   modeling the data communication network, the data communication network including user devices at indeterminate endpoints, the modeling employing a processing element and random access memory for nonvolatile storage of a program set, the program set including a network model, a modeled identity enforcement device and models of user roles modeled as network locations; and
   employing the models of the user roles to determine, from the modeling step, access that has been or can be granted by the modeled identity enforcement device to the modeled user role in the network model with respect to real user devices that are at indeterminate endpoints in a portion of the real network.

3. The method according to claim 2 wherein said employing step comprises:
   utilizing a user role interface added to the modeled identity enforcement device as if network traffic originated at the user role interface.

4. The method according to claim 2 wherein the modeling step comprises:
   obtaining configuration data of identity enforcement devices associated with the real users;
   generating interface definitions for each user device from standard interfaces in order to establish a device interface;
   and wherein the employing step comprises:
   testing for identity groups and if none exists, outputting a device description of the user device.

5. The method according to claim 2, wherein if identity groups exist in the identity enforcement device,
   associating identity groups with access rules; then
   generating identity groups as network interfaces for the modeled identity enforcement device, representing identity groups as if they are network endpoints connected to the identity enforcement device, and producing a device description for the identity enforcement device.

6. The method according to claim 5 wherein after said identity group generating step and prior to said testing step, attaching, to the identity interfaces, any access rules that were found to be associated with said identity group.

7. The method according to claim 2 wherein the user roles are decomposed into a first dynamic component and a second static component, the first dynamic component being an association of the user to the active network endpoint and the geographic and network location of the endpoint, and the second static component being rules applied to the user role.

8. The method of claim 7 wherein the user roles comprise rules, the rules being those that are applied to the user role such that only a static user role or a user role group is represented as an interface, in order to cause an appearance that the group of network users is connected at the location of the modeled identity enforcement device.

* * * * *